(12) United States Patent
Nishiuwatoko et al.

(10) Patent No.: US 6,901,229 B2
(45) Date of Patent: May 31, 2005

(54) DRIVING-FORCE TRANSMITTING PART, ELECTROPHOTOGRAPHIC PHOTOSENSITIVE DRUM, PROCESS CARTRIDGE AND ELECTROPHOTOGRAPHIC IMAGE FORMING APPARATUS

(75) Inventors: Tsutomu Nishiuwatoko, Shizuoka (JP); Teruhiko Sasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/965,802

(22) Filed: Oct. 1, 2001

(65) Prior Publication Data

US 2002/0044794 A1 Apr. 18, 2002

(30) Foreign Application Priority Data

Oct. 4, 2000 (JP) .......................................... 2000-304423
Mar. 19, 2001 (JP) .......................................... 2001-078104

(51) Int. Cl.[7] .............................................. G03G 15/00
(52) U.S. Cl. ........................................ 399/167; 399/111
(58) Field of Search ................................. 399/107, 110, 399/168

(56) References Cited

U.S. PATENT DOCUMENTS

| | | | |
|---|---|---|---|
| 5,585,902 A | 12/1996 | Nishiuwatoko et al. ..... 355/260 |
| 5,729,796 A | 3/1998 | Miura et al. ................. 399/114 |
| 5,768,658 A | 6/1998 | Watanabe et al. ........... 399/111 |
| 5,815,644 A | 9/1998 | Nishiuwatoko et al. ..... 399/113 |
| 5,825,472 A | 10/1998 | Araki et al. ................. 355/200 |
| 5,870,655 A | 2/1999 | Nishiuwatoko et al. ..... 399/111 |
| 5,893,006 A | 4/1999 | Kanno et al. .................. 399/13 |
| 5,903,803 A | 5/1999 | Kawai et al. ................ 399/116 |
| 5,920,753 A | 7/1999 | Sasaki et al. ............... 399/111 |
| 5,926,672 A | 7/1999 | Nishibata .................... 399/111 |
| 5,937,240 A | 8/1999 | Kanno et al. ................ 399/111 |
| 5,966,566 A | 10/1999 | Odagawa et al. ........... 399/109 |
| 6,016,416 A * | 1/2000 | Kitamura .................... 399/167 |
| 6,029,032 A | 2/2000 | Watanabe et al. ........... 399/111 |
| 6,070,029 A | 5/2000 | Nishiuwatoko et al. ..... 399/111 |
| 6,128,454 A | 10/2000 | Kawai et al. ................ 399/116 |
| 6,137,971 A | 10/2000 | Sasaki et al. ............... 399/106 |
| 6,137,973 A | 10/2000 | Nishiuwatoko ............. 399/111 |
| 6,141,508 A | 10/2000 | Sasaki et al. .................. 399/27 |
| 6,178,302 B1 | 1/2001 | Nagashima et al. ........ 399/106 |
| 6,183,075 B1 | 2/2001 | Sasaki ......................... 347/86 |
| 6,226,478 B1 | 5/2001 | Watanabe et al. ........... 399/117 |
| 6,240,266 B1 | 5/2001 | Watanabe et al. ........... 399/117 |
| 6,400,914 B1 | 6/2002 | Noda et al. .................. 399/90 |
| 2003/0223773 A1 * | 12/2003 | Prichett ...................... 399/117 |

FOREIGN PATENT DOCUMENTS

| | | |
|---|---|---|
| JP | 6-89069 | 3/1994 |
| JP | 8-328449 | 12/1996 |
| JP | 9-120231 | 5/1997 |
| JP | 10-153937 | 6/1998 |
| JP | 10-240103 | 9/1998 |
| JP | 10-282840 | 10/1998 |
| JP | 11-73085 | 3/1999 |
| JP | 2000-267374 | 9/2000 |

* cited by examiner

*Primary Examiner*—Quana M. Grainger
(74) *Attorney, Agent, or Firm*—Fitzpatrick, Cella, Harper & Scinto

(57) ABSTRACT

A process cartridge is detachably mountable to the main body of an electrophotographic image forming apparatus for forming an image on a recording medium. The image forming apparatus has a twisted hole, the cross-section of which has a plurality of corners. The process cartridge includes an electrophotographic photosensitive drum, a developing roller for developing an electrostatic latent image formed on the electrophotographic photosensitive drum, and a driving-force transmitting part provided on one lengthwise end of the electrophotographic photosensitive drum and having a twisted protrusion to be fitted in the hole and whose cross-section has a plurality of corners. The process cartridge also includes a shaft portion supported by a bearing portion, and a gear portion for transmitting a driving force to the developing roller, the shaft portion and the gear portion overlapping each other in the axial direction of the electrophotographic photosensitive drum.

29 Claims, 11 Drawing Sheets

US 6,901,229 B2

DRIVING-FORCE TRANSMITTING PART, ELECTROPHOTOGRAPHIC PHOTOSENSITIVE DRUM, PROCESS CARTRIDGE AND ELECTROPHOTOGRAPHIC IMAGE FORMING APPARATUS

BACKGROUND OF THE INVENTION

1. Field of the Invention

This invention relates to a driving-force transmitting part, and an electrophotographic photosensitive drum, a process cartridge and an electrophotographic image forming apparatus using the driving-force transmitting part.

Here, the electrophotographic image forming apparatus refers to an apparatus for forming an image on a recording medium by the use of the electrophotographic image forming process, and the term "electrophotographic image forming apparatus" covers an electrophotographic copier, an electrophotographic printer, (a laser printer, an LED printer or the like), a facsimile apparatus, a word processor or the like.

Also, the process cartridge may refer to charging means, developing means or cleaning means and an electrophotographic photosensitive drum integrally made into a cartridge which is made detachably mountable to the main body of the image forming apparatus. Alternatively, the process cartridge may refer to at least one of charging means, developing means and cleaning means and an electrophotographic photosensitive drum integrally made into a cartridge, which is made detachably mountable to the main body of the image forming apparatus. Further alternatively, the process cartridge may refer to at least developing means and an electrophotographic photosensitive drum integrally made into a cartridge, which is made detachably mountable to the main body of the apparatus.

2. Description of the Related Art

In image forming apparatus using the electrophotographic image forming process, there has heretofore been adopted a process cartridge system in which an electrophotographic photosensitive member and process means for acting on the electrophotographic photosensitive member are integrally made into a cartridge, which is made detachably mountable to the main body of the image forming apparatus. According to this process cartridge system, maintenance of the apparatus can be done by a user himself without resorting to a serviceman and therefore, the operability of the apparatus could be markedly improved. So, this process cartridge system has been widely used in the image forming apparatuses.

In an image forming apparatus to which such a process cartridge is detachably mountable, a driving device is disposed in the main body of the image forming apparatus, and a driving force is transmitted in each process means of the process cartridge through driving-force transmitting means. As such driving-force transmitting means, Japanese Patent Applications Laid-Open No. 08-328449 proposes means as shown in FIG. 11 of the accompanying drawings, wherein as a method, a driving shaft 100 formed with a twisted-polygonal recess 101 (in the shown example, a twisted-polygonal hole having a substantially equilateral triangular cross-section) is provided on the image forming apparatus side, and as shown in FIG. 10 of the accompanying drawings, a first flange 210 is formed with a twisted-polygonal prism-shaped protrusion 211 (in the example of FIG. 10, a twisted equilateral triangular prism having a substantially equilateral triangular cross-section) as driving-force transmitting means, and the protrusion 211 is inserted in the recess 101 to thereby transmit the driving force.

In the driving device, the transmission of the driving force is effected from the recess 101 to the protrusion 211 inserted in the recess 101 and therefore, the driving side and the driven side are normally in contact with each other and it becomes easy to improve the accuracy of rotation. Also, the vertices of the protrusion 211 tend to equally contact with the inner surface of the recess 101 and therefore, the axes are aligned with each other. Further, the two have the twisted shapes and therefore, forces act on the recess 101 and the protrusion 211 in a direction to attract them to each other and thus, the positioning of the photosensitive drum in the lengthwise direction thereof becomes easy.

In such an apparatus as previously described, the driving force transmitted to the first flange 210 is transmitted to a developing roller 41 shown in an embodiment of the present invention through a gear portion 213 provided on the flange, and to a transfer roller 70 through a second gear portion 221. In the example of the conventional art, a fit-sliding portion 212 is provided so as to protrude from the end surface perpendicular to the axis of the first gear portion 213. The fit-sliding portion 212 is fitted to and supported by a bearing provided in a cartridge frame.

The construction described in the aforementioned publication is practically very excellent as a driving system for an electrophotographic photosensitive drum.

The present invention is a further development of the conventional art proposed in the aforementioned Japanese Patent Application Laid-Open No. 08-328449.

SUMMARY OF THE INVENTION

It is an object of the present invention to provide a driving-force transmitting part, an electrophotographic photosensitive drum, a process cartridge and an electrophotographic image forming apparatus which can efficiently effect the transmission of a driving force.

It is another object of the present invention to provide a driving-force transmitting part, an electrophotographic photosensitive drum, a process cartridge and an electrophotographic image forming apparatus which enables the length of the electrophotographic photosensitive drum to be shortened.

It is another object of the present invention to provide a driving-force transmitting part, an electrophotographic photosensitive drum, a process cartridge and an electrophotographic image forming apparatus in which the accuracy of the rotation of the electrophotographic photosensitive drum could be improved.

It is another object of the present invention to provide a driving-force transmitting part, an electrophotographic photosensitive drum, a process cartridge and an electrophotographic image forming apparatus which can reliably effect the transmission of a driving force from the main body of the apparatus to the electrophotographic photosensitive drum.

It is another object of the present invention to provide a driving-force transmitting part, an electrophotographic photosensitive drum, a process cartridge and an electrophotographic image forming apparatus which has realized downsizing along the lengthwise direction of the electrophotographic photosensitive drum.

It is another object of the present invention to provide a driving-force transmitting part provided at a lengthwise end of an electrophotographic photosensitive drum, and having a twisted projection whose cross-section has a plurality of corners, a shaft portion supported by a bearing portion, and a gear portion for transmitting a driving force to a developing roller, the shaft portion and the gear portion overlapping each other in the axial direction of the electrophotographic photosensitive drum, an electrophotographic photosensitive drum, a process cartridge and an electrophotographic image forming apparatus.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS (Embodiment 1)
(General Construction)

Figure 1:
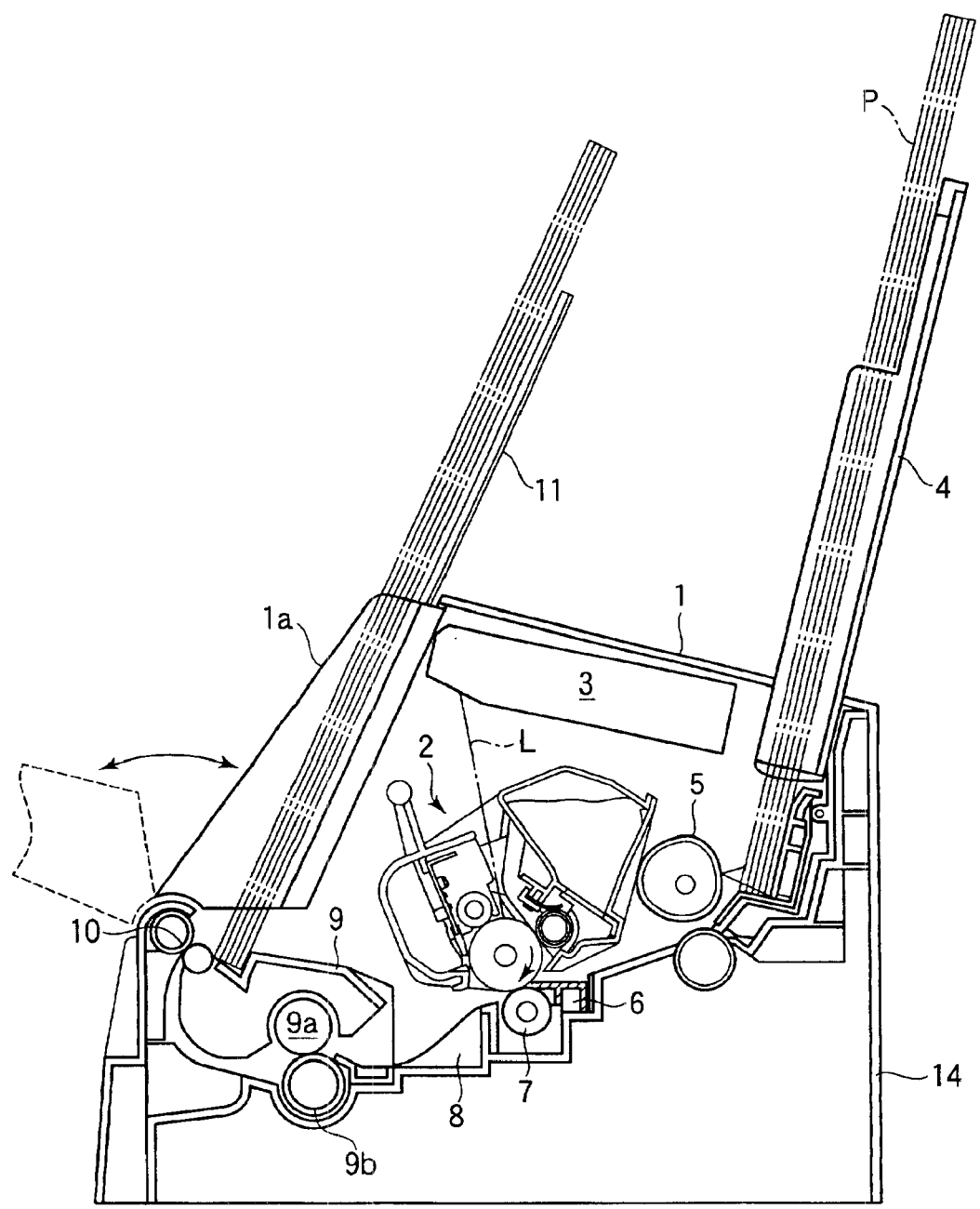
FIG. 1 is a longitudinal cross-sectional view of an image forming apparatus.
Figure 2:
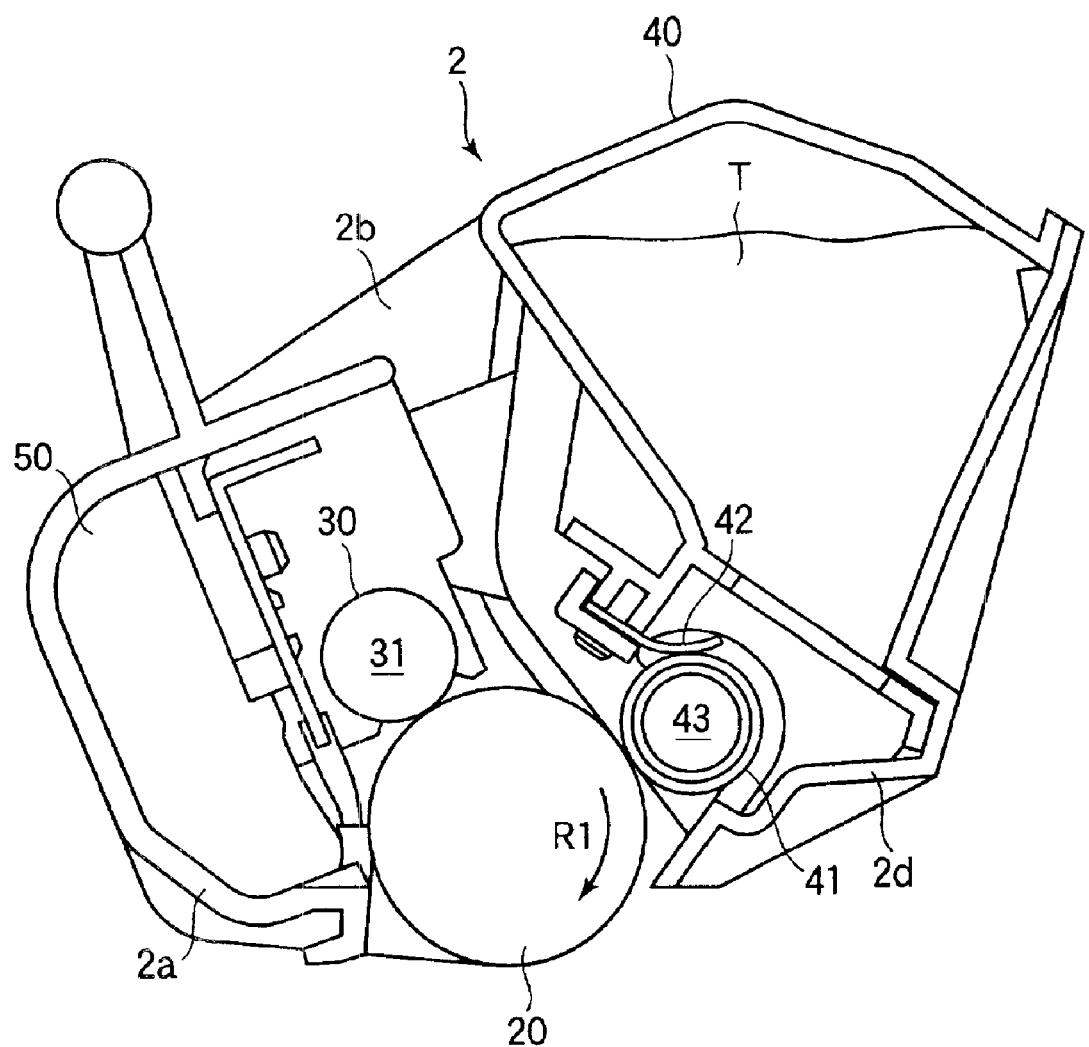
FIG. 2 is a longitudinal cross-sectional view of a process cartridge.

FIGS. 1 and 2 schematically show an image forming apparatus 1 and a process cartridge 2, respectively, according to the present invention. The image forming apparatus is a laser printer utilizing the electrophotographic art to which the process cartridge 2 is detachably mounted.

When the process cartridge 2 is mounted to the image forming apparatus 1, an exposure device (laser scanner unit) 3 is mounted above the process cartridge 2, and a sheet tray 4 containing therein recording media (sheets) P on which image formation is to be effected is disposed on the inner side (the right side as viewed in FIG. 1) of the process cartridge 2. Further, in the image forming apparatus 1, a feed roller 5, a transfer guide 6, a transfer device 7, a transporting guide 8, a fixing device 9, a pair of delivery rollers 10, and a delivery tray 11 are disposed along the transporting direction of the sheet P. The process cartridge 2 integrally contains therein four kinds of process devices, i.e., an electrophotographic photosensitive drum (hereinafter referred to as the photosensitive drum) 20, a charging device 30, a developing device 40 and a cleaning device 50.

The mounting of the process cartridge 2 is effected by opening an openable and closable cartridge door 1a, and inserting a guided portion (not shown) provided on the process cartridge 2 into a guide (not shown) provided in the image forming apparatus 1, and the process cartridge 2 and the image forming apparatus 1 are connected together at one end side thereof by driving-force transmitting means which will be described later. The other end side of the process cartridge 2 is positioned by the guide portion and the guided portion, but one end side of the process cartridge 2 is positioned by the connection of the driving-force transmitting means.

(Description of the Image Forming Process)

The epitome of image formation will now be described. On the basis of a print starting signal, the photosensitive drum 20 is rotatively driven at a predetermined peripheral speed (process speed) in the direction of arrow R. A charging roller 31 forming the main portion of the charging device 30 is in contact with the outer peripheral surface of the photosensitive drum 20 with a predetermined voltage applied thereto, and the outer peripheral surface of the photosensitive drum 20 is uniformly charged to predetermined potential.

A laser beam L modulated correspondingly to the time-series electrical digital pixel signal of desired image information is outputted from the exposure device 3 which is a laser scanner unit, and enters the interior of the process cartridge 2 from the exposure window portion 2b of the upper surface of the process cartridge 2 and scans the outer peripheral surface (photosensitive layer) of the photosensitive drum 20. Thereby, an electrostatic latent image corresponding to the desired image information is formed on the outer peripheral surface (photosensitive layer) of the photosensitive drum 20. This electrostatic latent image is developed as a toner image, by a developer (toner) T supplied from the developing device 40.

On the other hand, a sheet P is fed from the sheet tray 4 by the feed roller 5 in timed relationship with the outputting of the laser beam L, and is timing supplied to the transferring position between the photosensitive drum 20 and a transfer roller 70 forming the main portion of the transfer device 7, via the transfer guide 6. At this transferring position, the toner image is sequentially transferred from the photosensitive drum 20 to the sheet P.

The sheet P to which the toner image has been transferred is separated from the photosensitive drum 20 and is transported to the fixing device 9 along the transporting guide 8, and passes through the nip portion between a fixing roller 9a and a pressure roller 9b, and the pressurizing and heat fixing process is carried out in this nip portion, and the toner image is fixed on the sheet P. The sheet P on which the toner image has been fixed is transported to the pair of delivery rollers 10, and is delivered onto the delivery tray 11.

On the other hand, after the transfer, the photosensitive drum 20 has any residual toner on its outer peripheral surface removed by the cleaning device 50 and is again used for image formation beginning from charging.

(Description of the Photosensitive Drum)

Figure 6:
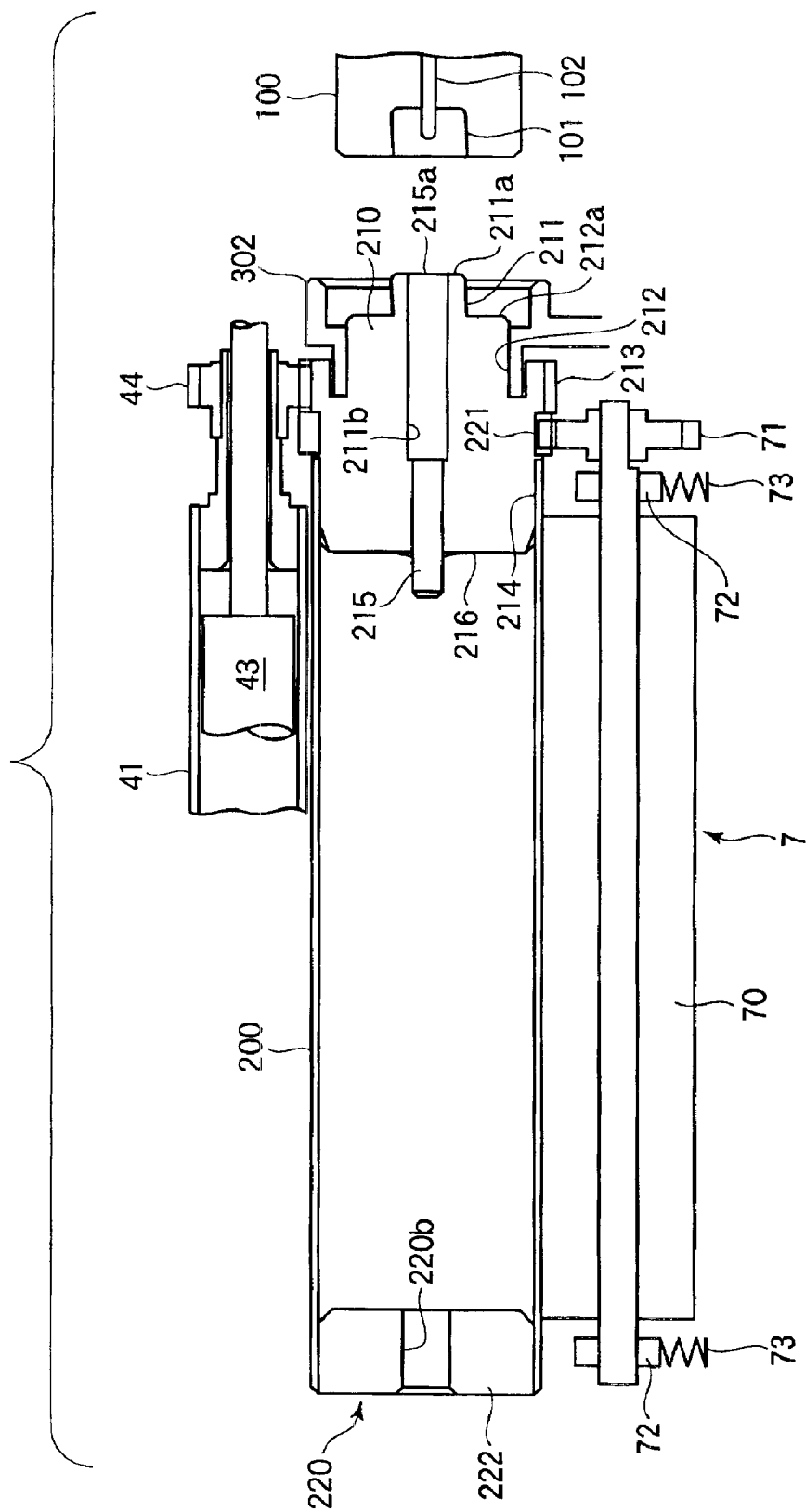
FIG. 6 is a partial cross-sectional view of the process cartridge of Embodiment 1.

The photosensitive drum 20, as shown in FIG. 6, is comprised of a drum cylinder 200 having a photosensitive layer formed on the outer peripheral surface of a cylinder formed of a nonmagnetic electrically conductive material such as aluminum, a first flange 210 fixed to one end of the drum cylinder 200, and a second flange 220 fixed to the other end of the drum cylinder 200.

The first flange 210 has a projection-shaped protrusion 211 as a driving-force transmitted portion which will be described later, a rotary sliding portion 212 which is a supported portion which will be described later, a first gear portion 213 as a driving-force transmitting portion to a unit internal mechanism, a second gear portion 221 for rotatively driving the transfer device 7 which will be described later, and a first coupling portion which is a fixed portion fitted and fixed to the drum cylinder 200, and is fitted and fixed to the drum cylinder 200 at the first coupling portion 214. In the present embodiment, the first gear portion 213 is a helical gear, and the second gear portion 221 is a spur gear.

The second flange 220 has a second coupling portion 222, and is fitted and fixed to the drum cylinder 200 at the second coupling portion 222.

A hole 211b is formed in the axis portion of the first flange 210, and a grounding pin 215 is forced in this bole 211b. A grounding plate 216 is attached to the inner end surface of the first flange 210, and the drum cylinder 200 and the protrusion side end surface 215a of the grounding pin 215 conduct electricity to each other. The second flange 220 is rotatably supported by a drum shaft 350 (see FIG. 9) fitted in the central hole 220b thereof. This drum shaft 350 is fixed to a frame 2a shown in FIG. 9. The fixing of the first and second flanges 210 and 220 to the drum cylinder 200 is done by caulking, adhesive securing or force-fitting.

Figure 7:
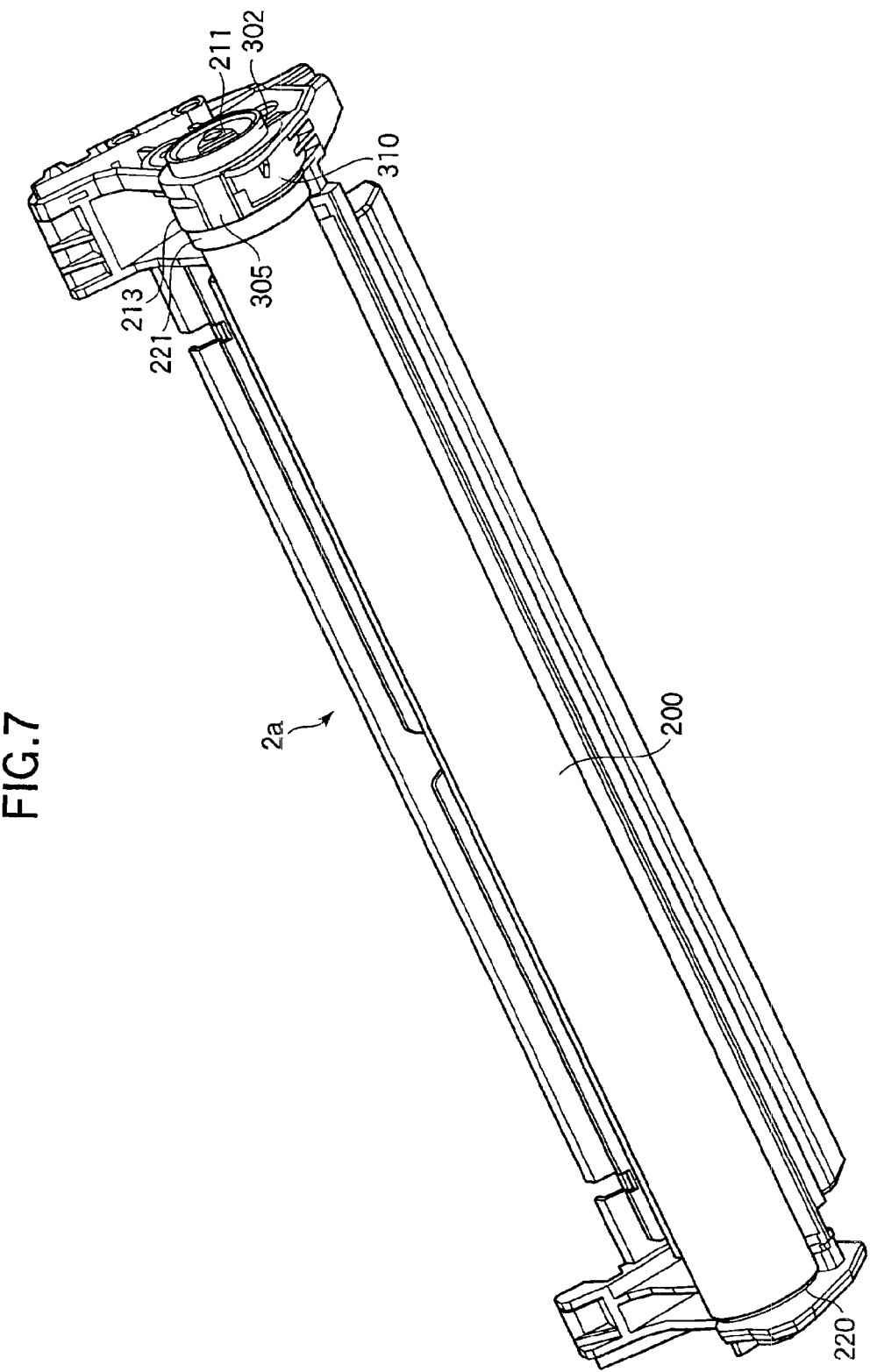
FIG. 7 is a perspective view showing the first frame of Embodiment 1.
Figure 8:
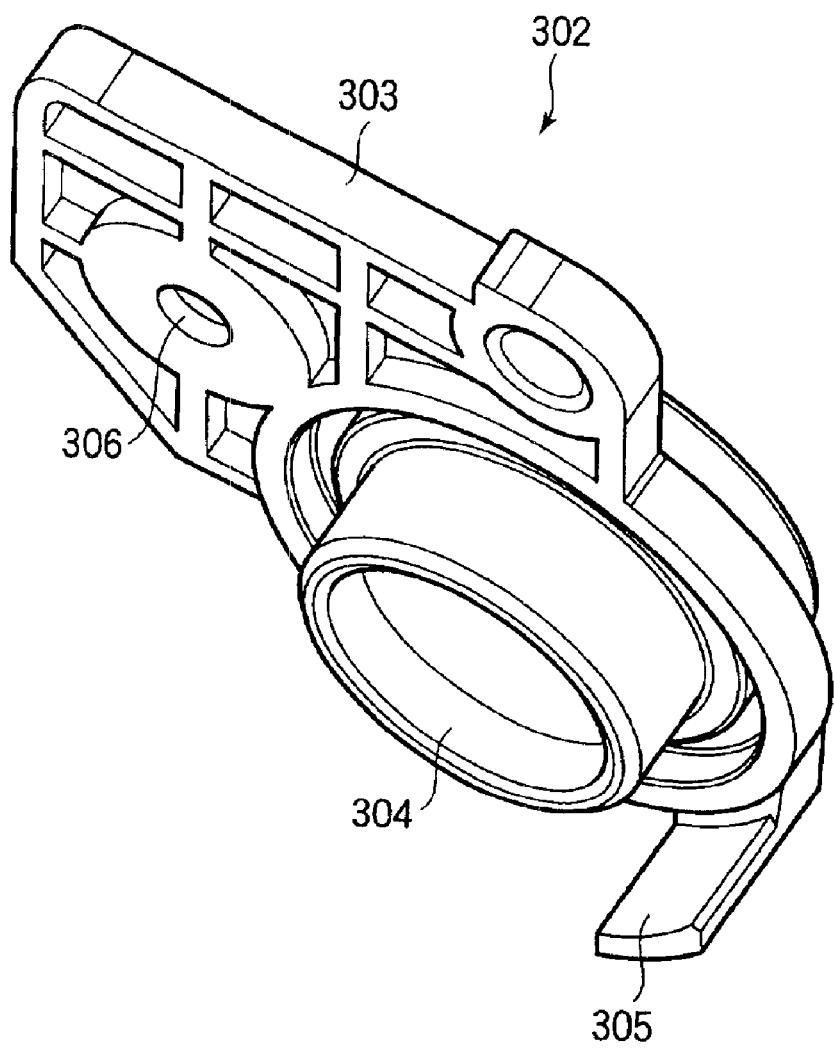
FIG. 8 is a perspective view showing the drum bearing of Embodiment 1.
Figure 9:
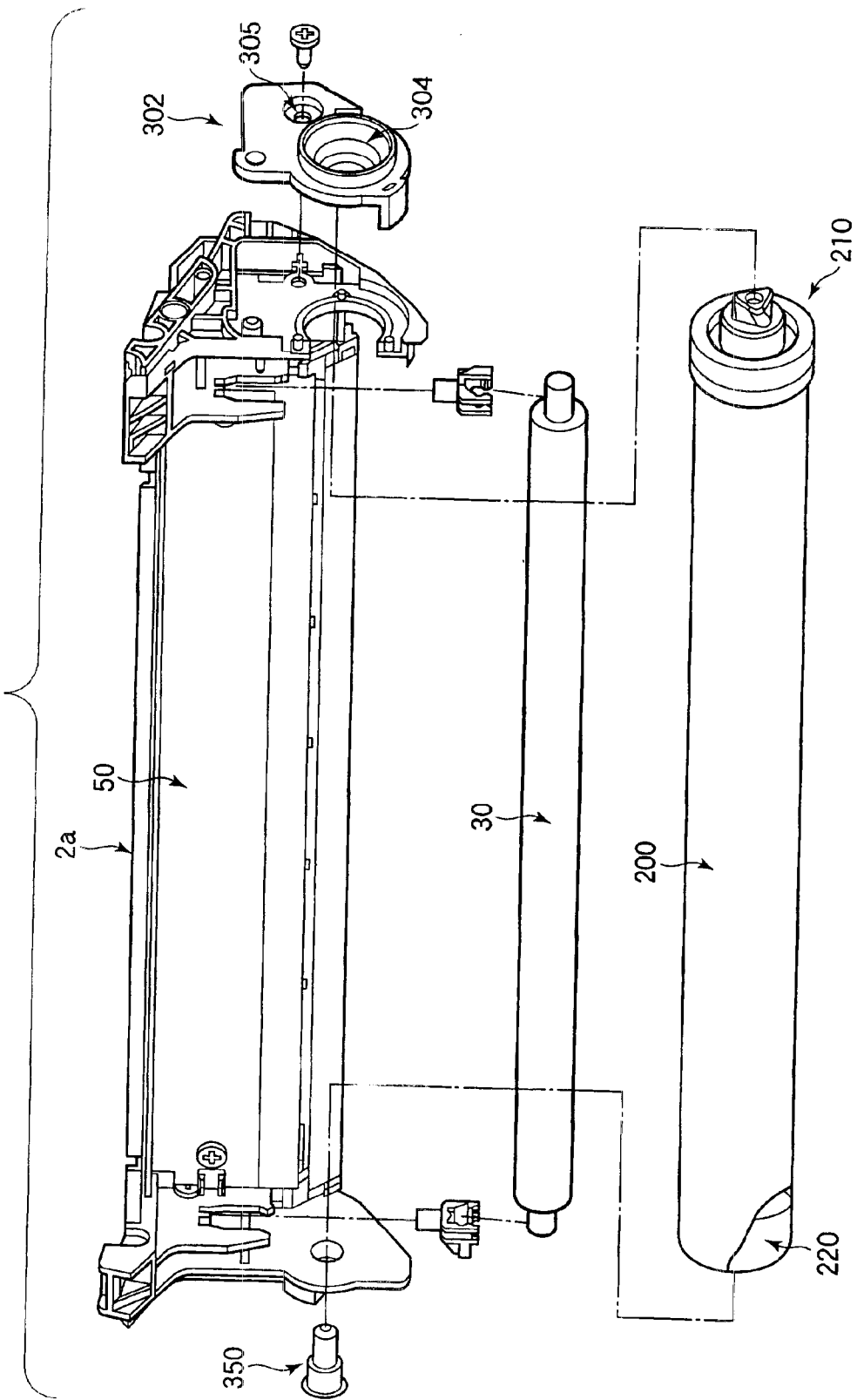
FIG. 9 is a perspective view showing the drum bearing and drum shaft of Embodiment 1.
Figure 10:
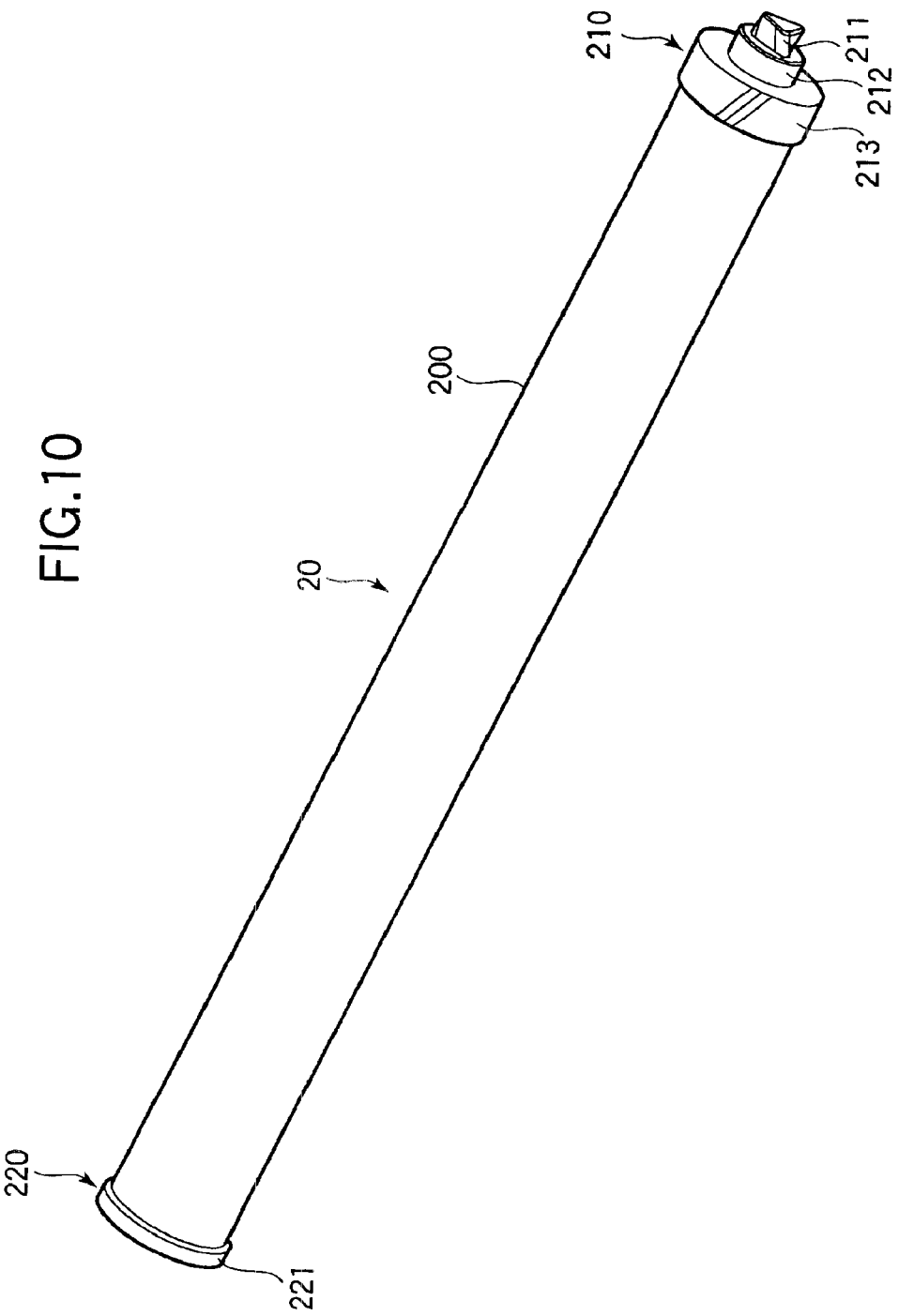
FIG. 10 is a perspective view showing a photosensitive drum according to the conventional art.
Figure 11:
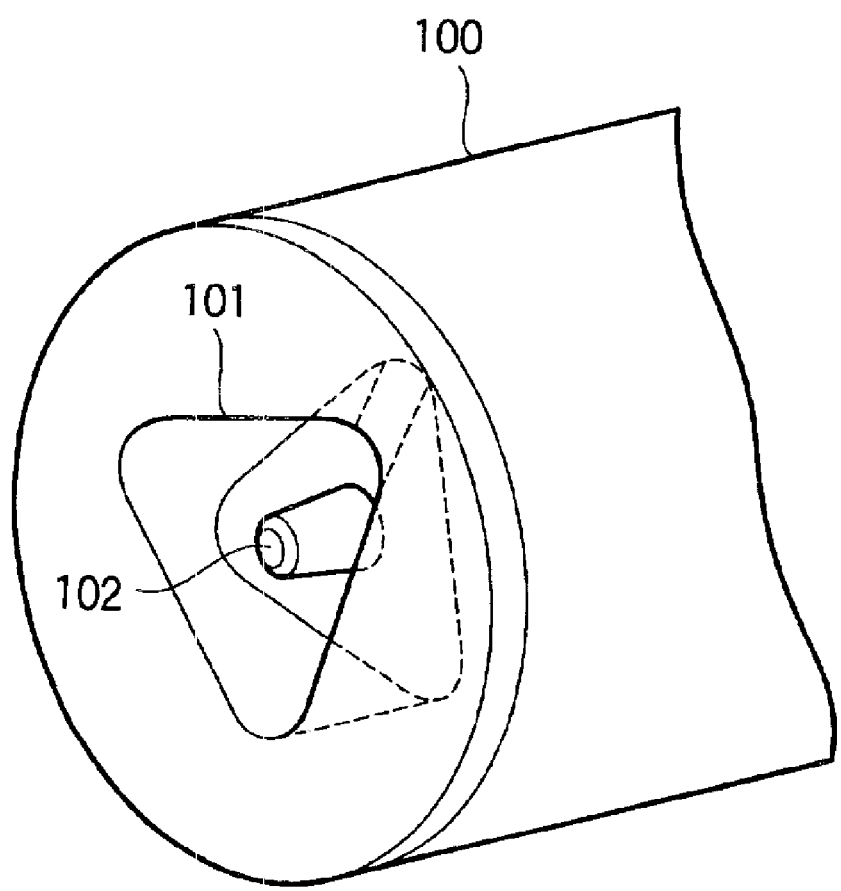
FIG. 11 is a perspective view of a driving shaft.

The photosensitive drum 20 is rotatably mounted on the frame 2a by means of a drum bearing 302 disposed at one end side thereof which is shown in FIGS. 8 and 9, and a drum shaft 350 disposed at the other end side thereof. The drum bearing 302 has a base portion 303, a cover portion 305 and a small screw hole 306 as fixing means. The first gear portion 213 of the first flange 210, in its assembled state, is covered with the cover portion 305 of the drum bearing 302 and the protective wall 310 of the frame 2a, as shown in FIG. 7. Further, the second gear portion 221 is protected by a shutter member (not shown) for protecting the photosensitive drum 20.

(Description of the Developing Device)

As shown in FIG. 2, the developing device 40 has a developing roller 41 as means for containing a toner T therein and supplying the toner T to the photosensitive drum 20. The developing roller 41 having its opposite ends rotatably supported by a cartridge frame 2d contains a magnet roller 43 therein, and further as shown in FIG. 6, has a developing roller gear 44 mounted on one end thereof. The developing roller gear 44 meshes with the first gear portion 213 of the photosensitive drum 20 to thereby form a gear train, and the developing roller 41 is rotatively driven.

At this time, the toner T is attracted to the vicinity of the developing roller 41 by the magnetic force of the magnet roller 43, is carried toward a developing blade 42 by the rotation of the developing roller 41, and has its layer thickness regulated by the developing blade 42 and has predetermined charges imparted thereto, and is carried toward the photosensitive drum 20.

(Description of the Transfer Device)

The transfer device 7, as shown in FIG. 6, is comprised of a transfer roller 70 having an electrically conductive coating layer formed on the outer periphery of a core material, a transfer roller gear 71 fixed to one end portion of the transfer roller 70, and transfer bearings 72 and transfer springs 73 disposed on the opposite ends of the transfer roller 70. The transfer roller gear 71 cooperates with the second gear of the photosensitive drum 20 to form a gear train, and the transfer roller 70 is rotatively driven while being biased toward the photosensitive drum 20. Also, at least one transfer bearing 72 and at least one transfer spring 73 together form an electric power supply path, and in case of image formation, a predetermined transfer bias is supplied to the transfer roller 70. The transfer bearings 72 are movably provided on a guide, not shown, in a direction linking the centers of the photosensitive drum 20 and the transfer roller 70 together. The guide is provided in the image forming apparatus 1.

(Description of the Driving-Force Transmission)

Figure 4:
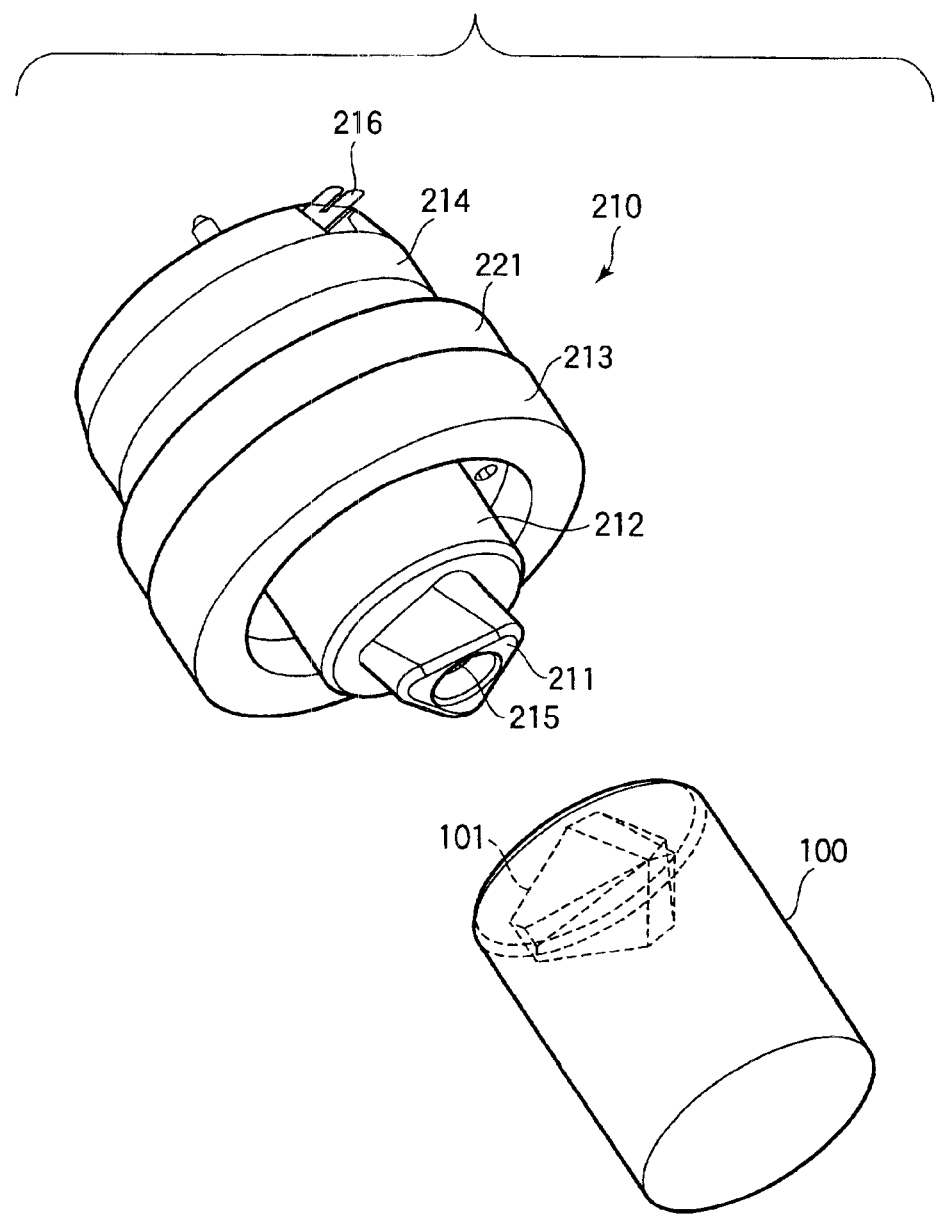
FIG. 4 is a perspective view showing the first flange of Embodiment 1.
Figure 5:
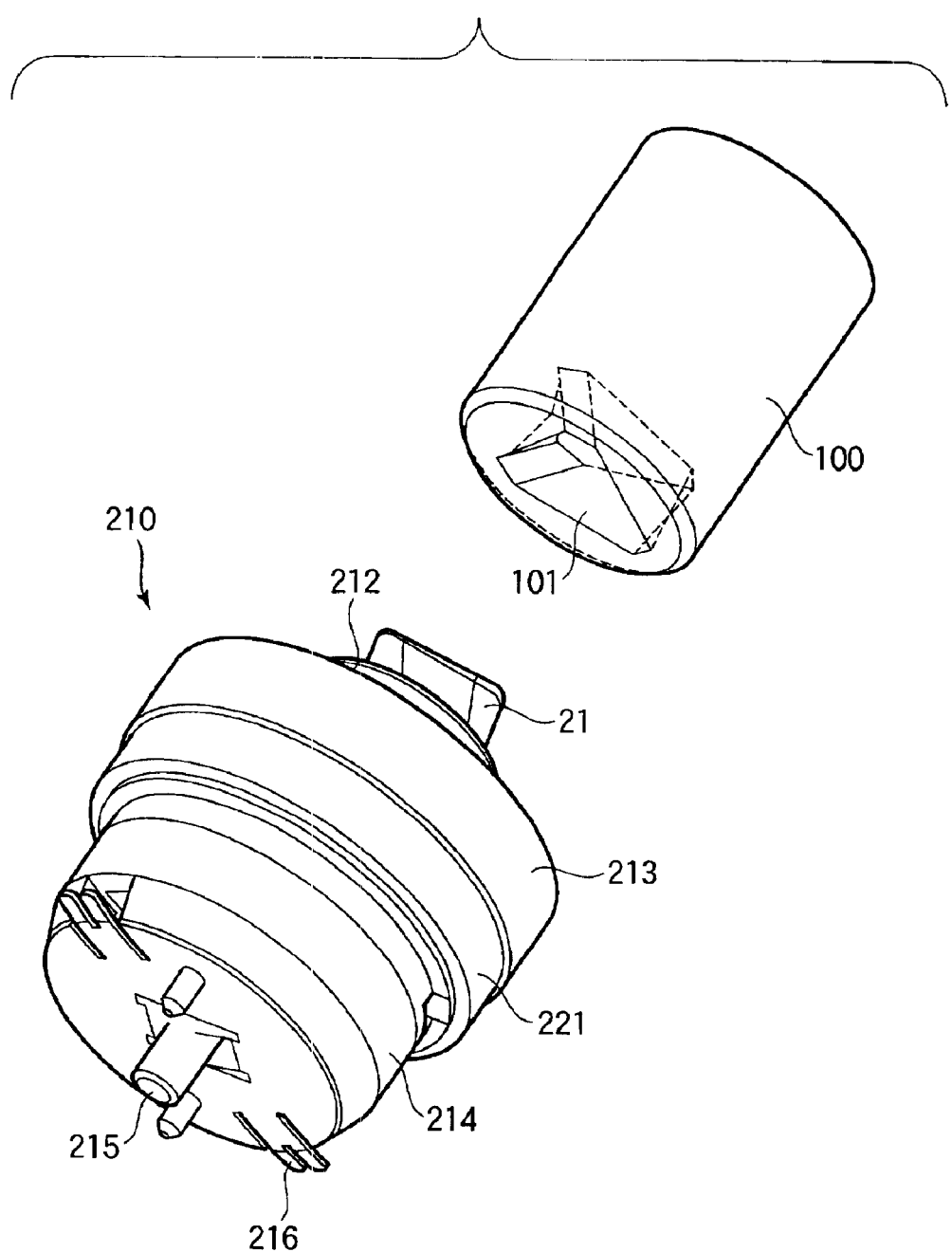
FIG. 5 is a perspective view showing the first flange of Embodiment 1.

Reference is now had to FIGS. 4, 5 and 6 to describe the protrusion 211 of the first flange 210 which provides the driving-force transmitted means of the image forming apparatus 1 and the process cartridge 2, and a recess 101 formed in a driving shaft 100.

The first flange 210, as shown in FIG. 6, has the first coupling 214 fitted in and fixed to the drum cylinder 200, the second gear portion 221, the first gear portion 213, the rotary sliding portion (shaft portion) 212 overlapping the first gear portion 213, and the protrusion 211 which is of an axial projection shape having a protrusion side end surface 211a provided on the end surface of the rotary sliding portion 212 axially in the named order and molded integrally with one another. As is apparent from FIGS. 4 and 6, a portion of the rotary sliding portion (shaft portion) 212 is surrounded by the gear portion 213.

The protrusion 211 of the first flange 210 which is the driving-force transmitted means has a twisted prism shape having a substantially equilateral triangular cross-section. On the other hand, the driving shaft 100 is disposed in the image forming apparatus 1 at a location corresponding to the protrusion 211. The tip end portion of the driving shaft 100 is formed with a twisted polygonal recess 101 having a substantially equilateral triangular cross-section into which the protrusion 211 is insertable.

The driving shaft 100 is connected to the cartridge door 1a by a mechanism, not shown, and is designed to be axially pulled into the image forming apparatus 1 in the opened state of the cartridge door 1a, and be axially biased toward the process cartridge 2 with predetermined pressure by a spring in the closed state of the cartridge door 1a. Therefore, the protrusion 211 of the first flange 210 and the recess 101 of the driving shaft 100 fit together during the closing of the cartridge door 1a or immediately after the start of driving.

The driving shaft 100 is provided with a large gear, not shown, coaxially therewith, and rotation is transmitted from a motor, not shown, mounted in the main body 14 of the apparatus to this large gear by a gear train (not shown). The above-mentioned large gear and gear train will hereinafter be referred to as the apparatus main body gears or the main body gears.

Figure 3A:
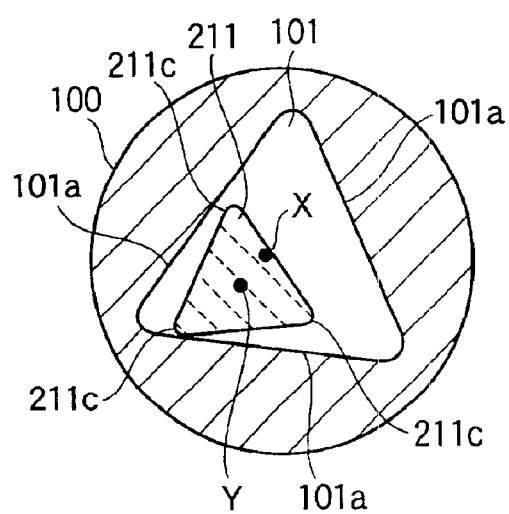
FIGS. 3A and 3B are cross-sectional views, taken along a plane perpendicular to an axis, of a protrusion and a recess which are driving-force transmitting means.
Figure 3B:
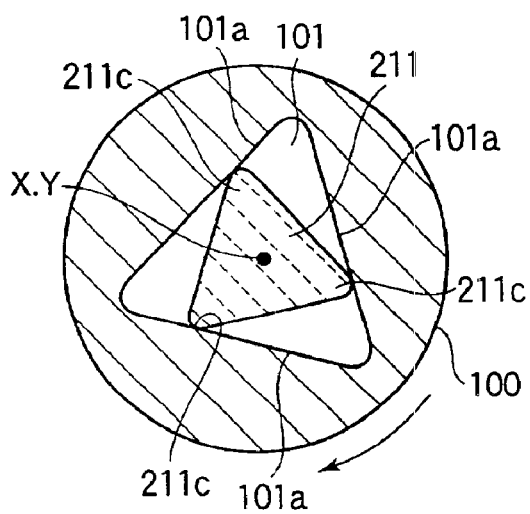

In a state in which the process cartridge 2 is inserted in the image forming apparatus 1, one end side of the process cartridge 2 opposed to the driving shaft 100 which corresponds to one end side of the drum cylinder 200 is radially held relative to an operating position with play or slop by means, not shown, and therefore, as shown in FIG. 3A, the axis Y of the protrusion 211 and the axis X of the recess 101 deviate from each other by an amount corresponding to the aforementioned play or slop. However, when the driving shaft 100 is rotatively driven with the protrusion 211 inserted in the recess 101, the vertices 211c of the protrusion which are the chamfered ridges of the protrusion 211 try to equally abut against the inner surface 101a of the recess 101. Here, the axis of the driving shaft 100 formed with the recess 101 is provided so as to be immovable relative to the frame of the image forming apparatus and therefore, the axis Y of the protrusion aligns with the axis X of the recess (see FIG. 3B). Further, a force acts on the recess 101 and the protrusion 211 in directions to attract them to each other by the twisted-shape thereof and therefore, the photosensitive drum 20 is attracted to the driving shaft 100 side, and is positioned bodily with the process cartridge 2, and the photosensitive drum 20 is rotatively driven. At this time, the developing roller 41 has a driving force transmitted thereto via the first gear portion 213 and the developing roller gear 44, and the transfer roller 70 has a driving force transmitted thereto via the second gear portion 221 and the transfer roller gear 71 and therefore, both the developing roller 41 and the transfer roller 70 are also rotatively driven by the photosensitive drum 20.

As shown in FIGS. 5 and 6, an electrically grounded grounding contact 102 is provided in the central portion of the driving shaft 100. The grounding contact 102 is biased toward the process cartridge 2 side by biasing means, not shown. When the process cartridge 2 is mounted, the grounding contact 102 contacts with the protrusion side end surface 215a of a grounding pin 215, and the drum cylinder 200 is electrically grounded.

(Description of the First Flange)

The first flange 210, as previously described, has the protrusion 211, the rotary sliding portion 212, the first gear portion 213, the second gear portion 221 and the first coupling portion 214.

The protrusion 211, as previously described, is the driving-force transmitted means and has a twisted prism shape whose cross-section is a substantially equilateral triangle. The first gear portion 213, as previously described, cooperates with the developing roller gear 44 to form a gear train, and transmits the driving force transmitted thereto from the protrusion 211 to the developing roller gear 44. The first coupling portion 214 is a coupling portion to the drum cylinder 200, and the first flange 210 is fixed to the drum cylinder 200 by the first coupling portion 214.

The second gear portion 221 is disposed between the first gear portion 213 and the first coupling portion 214, and comes into meshing engagement with the transfer roller gear 71 to thereby form a gear train when the process cartridge 2 is inserted into the image forming apparatus 1. In the present embodiment, the driving gear 100 and the transfer roller gear 71 are disposed in proximity to each other and it is easier to keep the mutual positional relation at higher accuracy and therefore, in the present embodiment, the gear width of the second gear portion 221 cooperating with the transfer roller gear 71 to form a gear train is made narrower than the gear width of the second gear portion 221 described in connection with the conventional art.

The first flange 210 is rotatably held on a drum bearing 302 fixed to the frame 2a (see FIG. 2) of the process cartridge 2, by the rotary sliding portion (shaft portion) 212, but as previously described, during the operation of the apparatus, the protrusion 211 is attracted until the axis Y of the protrusion aligns with the axis X of the recess 101 of the driving shaft 100 and thus the weight of the process cartridge 2 is applied to the first flange 210. Therefore, in order to keep the surface pressure of the rotary sliding portion 212 of the first flange 210 and the drum bearing 302 adjacent to the frame 2a at a moderate value, the width of the rotary sliding portion 212 is set to a rather great value, but in the present embodiment, the rotary sliding portion 212 is made to pass under the first gear portion 213 to thereby make the rotary sliding portion 212 and the first portion 213 axially overlap each other. One drum bearing 302 comes into the back of the first gear 213, and the rotary sliding portion 212 and the drum bearing 302 are in a sliding fit relation with each other.

According to the embodiment, the axial length of the first flange 210 which is a driving-force transmitting part is short, and particularly the protruding length from the drum cylinder 200 is short. Accordingly, the axial length of the photosensitive drum 20, the lengthwise dimension of the process cartridge 2 and the width of the image forming apparatus can be made small.

The drive transmitting construction of the driving shaft 100 may be such that the driving shaft 100 has a twisted prism shape having a substantially equilateral triangular cross-section and the first flange 210 side is of a twisted polygonal recess shape having a substantially triangular cross-section into which a twisted prism shape is insertable. Also, in the present embodiment, the first gear portion 213 is a helical gear and the second gear portion 221 is a spur gear, but this is not restrictive.

The above-described embodiment will be summed up and described as follows.

Firstly, the electrophotographic photosensitive drum 20 is used in the process cartridge 2 detachably mountable to the main body 14 of the electrophotographic image forming apparatus for forming an image on a sheet P which is a recording medium. The main body 14 has a motor, not shown, provided in the main body 14 of the image forming apparatus 1, the apparatus main body gear, not shown, for transmitting the driving force of the motor, the apparatus main body gear being coaxial with and integrally having the driving shaft 100, and the recess 101 provided in the central portion of the main body gear and rotated with the main body gear and which is a non-circular twisted hole whose cross-section has vertices 211c which are a plurality of corners.

The electrophotographic photosensitive drum 20 has (a) the cylinder 200 having a photosensitive layer on the peripheral surface thereof, and (b) the first flange 210 which is a driving-force transmitting part mounted on one end of the cylinder 200, and having the second gear portion 221 which is a spur gear for transmitting a driving force received from the main body 14 of the apparatus to the transfer roller 70 provided in the main body 14 of the apparatus when the process cartridge 2 is mounted to the main body 14 of the apparatus, the first gear portion 213 which is a helical gear provided in juxtaposed relationship with the spur gear 221 for transmitting the driving force received from the main body 14 of the apparatus to the developing roller 41 provided in the process cartridge 2 when the process cartridge 2 is mounted to the main body 14 of the apparatus, the rotary sliding portion 212 which is a shaft portion provided in juxtaposed relationship with the helical gear 213 and rotatably supported on the drum bearing 302 which is a bearing portion when the photosensitive drum 20 is mounted in the process cartridge 2, and the protrusion 211 which is a non-circular twisted projection fitted into the recess 101 which is a hole provided in the main body 14 of the apparatus to receive the transmission of the driving force from the main body 14 of the apparatus when the process cartridge 2 is mounted to the main body 14 of the apparatus and whose cross-section has a plurality of corners 211c.

An area rotatably supported by the bearing portion 302 overlaps an area in which the helical gear 213 is provided when the photosensitive drum 20 is mounted in the process cartridge 2 in the axial direction thereof, and the driving-force transmitting part transmits the driving force received from the main body 14 of the apparatus through the hole 101 and the projection 211 to the cylinder 200 through the helical gear 213 and the spur gear 221, and transmits the driving force to the developing roller 41 through the helical gear 213, and transmits the driving force to the transfer roller 70 through the spur gear 221.

Secondly, on the end surface of the helical gear 213, a circular recess is provided on a line coaxial with the axis thereof, and the bearing portion 302 slides with the outer peripheral surface of the shaft portion 212 and the inner peripheral surface of the recess which is continuous from the outer peripheral surface, and rotatably supports the shaft portion 212 and the recess.

Thirdly, the photosensitive drum 20 further has the grounding pin 215 as a grounding member for grounding the photosensitive drum 20 to the main body 14 of the apparatus when the process cartridge 2 is mounted to the main body 14 of the apparatus and which is provided at the center of the driving-force transmitting part 210 through the same in the axial direction thereof.

Fourthly, the driving-force transmitting part 210 is an integrally molded article of resin comprising the first coupling portion 214 which is a fitted portion fitted to one end of the cylinder 200, the spur gear 221, the helical gear 213 and the projection 211 molded integrally with one another.

Fifthly, the tooth width of the spur gear 221 is narrower than the tooth width of the helical gear 213, and the number of teeth of the spur gear 221 is smaller than the number of teeth of the helical gear 213.

Sixthly, the shape of the protrusion 211 is a substantially equilateral triangular prism, and the protrusion vertices 211c which are the corners of the substantially equilateral triangular prism are chamfered, and the protrusion 211 is fitted in the hole 101 whose cross-section is a substantially equilateral triangle.

Seventhly, the process cartridge 2 is detachably mountable to the main body 14 of the electrophotographic image forming apparatus 1 for forming an image on a sheet P which is a recording medium. The main body 14 has a motor, not shown, provided in the main body 14 of the image forming apparatus, the apparatus main body gear, not shown, for transmitting the driving force of the motor, the apparatus main body gear being coaxial with and integrally having the driving shaft 100, and the recess 101 provided in the central portion of the main body gear and which is a non-circular twisted hole rotated with the main body gear and whose cross-section has a plurality of corners 211c.

The process cartridge 2 comprises (a) the electrophotographic photosensitive drum 20 comprising a. the cylinder 200 having a photosensitive layer on the peripheral surface thereof, and b. the first flange 210 which is a driving-force transmitting part mounted on one end of the cylinder 200, and having the second gear portion 221 which is a spur gear for transmitting a driving force received from the main body 14 of the apparatus to the transfer roller 70 provided in the main body 14 of the apparatus when the process cartridge 2 is mounted to the main body 14 of the apparatus, the first gear portion 213 which is a helical gear provided in juxtaposed relationship with the spur gear 221 for transmitting the drive force received from the main body 14 of the apparatus to the developing roller 41 provided in the process cartridge 2 when the process cartridge 2 is mounted to the main body 14 of the apparatus, the rotary sliding portion 212 which is a shaft portion provided in juxtaposed relationship with the helical gear 213 and rotatably supported by the drum bearing 302 which is a bearing portion when the photosensitive drum 20 is mounted in the process cartridge 2, and the protrusion 211 which is a non-circular twisted projection fitted into the recess 101 which is a hole to receive the transmission of the driving force from the main body 14 of the apparatus when the process cartridge 2 is mounted to the main body 14 of the apparatus, and whose cross-section has a plurality of corners 211c.

An area rotatably supported by the bearing portion 302 overlaps an area in which the helical gear 213 is provided when the photosensitive drum 20 is mounted in the process cartridge 2 in the axial direction thereof, and the driving-force transmitting part transmits the driving force received from the main body 14 of the apparatus through the hole 101 and the projection 211 to the cylinder 200 through the helical gear 213 and the spur gear 221, and transmits the driving force to the developing roller 41 through the helical gear 213, and transmits the driving force to the transfer roller 70 through the spur gear 221, and (b) the developing roller 41 for developing an electrostatic latent image formed on the photosensitive drum 20.

Eighthly, on the end surface of the helical gear 213, a circular recess is provided on a line coaxial with the axis thereof, and the bearing portion 302 slides with the outer peripheral surface of the shaft portion 212 and the inner peripheral surface of the recess which is continuous from the outer peripheral surface, and rotatably supports the shaft portion 212 and the recess.

Ninthly, the photosensitive drum 20 further has the grounding pin 215 which is a grounding member for grounding the photosensitive drum 20 to the main body 14 of the apparatus when the process cartridge 2 is mounted to the main body 14 of the apparatus, and which is provided at the center of the driving-force transmitting part 210 through the same in the axial direction thereof.

Tenthly, the driving-force transmitting part 210 is an integrally molded article of resin comprising the fitted portion 214 fitted to one end of the cylinder 200, the spur gear 221, the helical gear 213 and the protrusion 211 molded integrally with one another.

Eleventhly, the tooth width of the spur gear 221 is narrower than the tooth width of the helical gear 213, and the number of teeth of the spur gear 221 is smaller than the number of teeth of the helical gear 213.

Twelfthly, the shape of the protrusion 211 which is a projection is a twisted substantially equilateral triangular prism, and the vertices 211c which are the corners of the substantially equilateral triangular prism are chamfered, and the protrusion is fitted in the recess 101 of which the cross-section is a substantially equilateral triangle.

Thirteenthly, the driving-force transmitting part is used in the process cartridge 2 detachably mountable to the main body 14 of the electrophotographic image forming apparatus 1 for forming an image on a sheet P which is a recording medium. The main body 14 has a motor, not shown, provided in the main body of the image forming apparatus, the main body gear, not shown, for transmitting the driving force of the motor, the apparatus main body gear being coaxial with and integrally having the driving shaft 100, and the recess 101 which is a non-circular twisted hole provided in the central portion of the apparatus main body gear and rotated with the main body gear and whose cross-section has vertices 211c which are a plurality of corners.

The driving-force transmitting part has the fitted portion 214 fitted in the cylinder 200 in order to be mounted on one end of the cylinder 200 of the electrophotographic photosensitive drum 20, the spur gear 221 for transmitting the driving force received from the main body 14 of the apparatus to the transfer roller 70 provided in the main body 14 of the apparatus when the process cartridge 2 is mounted to the main body 14 of the apparatus, the helical gear 213 provided in juxtaposed relationship with the spur gear 221 for transmitting the driving force received from the main body 14 of the apparatus to the developing roller 41 provided in the process cartridge 2 when the process cartridge 2 is mounted to the main body 14 of the apparatus, the rotary sliding portion 212 which is the shaft portion 212 provided in juxtaposed relationship with the helical gear 213 and rotatably supported by the bearing 302 which is a bearing portion when the photosensitive drum 20 is mounted in the process cartridge 2, and the protrusion 211 which is a non-circular twisted projection fitted into the recess 101 which is a hole to receive the transmission of the driving force from the main body of the apparatus when the process cartridge 2 is mounted to the main body 14 of the apparatus and whose cross-section has a plurality of corners 211c.

When the photosensitive drum 20 is mounted in the process cartridge 2 in the axial direction thereof, an area rotatably supported by the bearing portion 302 overlaps an area in which the helical gear 213 is provided, and the driving-force transmitting part transmits the driving force received from the main body 14 of the apparatus through the hole 101 and the projection 211 to the cylinder 200 through the helical gear 213 and the spur gear 221, and transmits the driving force to the developing roller 41 through the helical gear 213, and transmits the driving force to the transfer roller 70 through the spur gear 221.

Fourteenthly, on the end surface of the helical gear 213, a circular recess is provided on a line coaxial with the axis thereof, and the bearing portion 302 slides with the outer peripheral surface of the shaft portion 212 and the inner peripheral surface of the recess which is continuous from the outer peripheral surface, and rotatably supports the shaft portion 212 and the recess.

Fifteenthly, the photosensitive drum 20 further has the grounding pin 215 which is a grounding member for grounding the photosensitive drum 20 to the main body 14 of the apparatus when the process cartridge 2 is mounted to the main body 14 of the apparatus, and which is provided at the center of the driving-force transmitting part 210 through the same in the axial direction thereof.

Sixteenthly, the driving-force transmitting part 210 is an integrally molded article of resin comprising the fitted portion 214 fitted to one end of the cylinder 200, the spur gear 221, the helical gear 213 and the protrusion 211 molded integrally with one another.

Seventeenthly, the tooth width of the spur gear 221 is narrower than the tooth width of the helical gear 213, and the number of teeth of the spur gear 221 is smaller than the number of teeth of the helical gear 213.

Eighteenthly, the shape of the protrusion 211 is a twisted substantially equilateral triangular prism, and the corners 211c of the substantially equilateral triangular prism are chamfered, and the protrusion is fitted into the hole 101 whose cross-section is a substantially equilateral triangle.

Nineteenthly, the electrophotographic image forming apparatus 1 is provided for forming an image on a sheet P which is a recording medium to which the process cartridge 2 is detachably mountable. The electrophotographic image forming apparatus has (a) a motor, (b) the main body gear for transmitting the driving force of the motor, (c) the recess 101 which is a non-circular twisted hole provided in the central portion of the main body gear and rotated with the main body gear and whose cross-section has vertices 211c which are a plurality of corners, (d) the transfer roller 70 for transferring a developed image formed on the electrophotographic photosensitive drum 20 to the recording medium P, and (e) a mounting portion for detachably mounting the process cartridge 2. The process cartridge 2 has (i) the electrophotographic photosensitive drum 2 having a. the cylinder 200 having a photosensitive layer on the peripheral surface thereof, and b. the driving-force transmitting part 210 mounted on one end of the cylinder 200, and having the spur gear 221 for transmitting a driving force received from the main body 14 of the apparatus to the transfer roller 70 when the process cartridge 2 is mounted to the main body 14 of the apparatus, the helical gear 213 provided in juxtaposed relationship with the spur gear 221 for transmitting the driving force received from the main body 14 of the apparatus to the developing roller 41 provided in the process cartridge 2 when the process cartridge 2 is mounted to the main body of the apparatus, the shaft portion 212 provided in juxtaposed relationship with the helical gear 213 and rotatably supported by the bearing portion 302 when the photosensitive drum 20 is mounted in the process cartridge 2, and the non-circular twisted protrusion 211 fitted into the hole 101 to receive the transmission of the driving force from the main body of the apparatus when the process cartridge 2 is mounted to the main body 14 of the apparatus and whose cross-section has a plurality of corners 211c.

An area rotatably supported by the bearing portion 302 overlaps an area in which the helical gear 213 is provided when the photosensitive drum 20 is mounted in the process cartridge 2 in the axial direction thereof, and the driving-force transmitting part transmits the driving force received from the main body of the apparatus through the hole 101 and the projection 211 to the cylinder 200 through the helical gear 213 and the spur gear 221, and transmits the driving force to the developing roller 41 through the helical gear 213, and transmits the driving force to the transfer roller 70 through the spur gear 221, and (ii) the developing roller 41 for developing an electrostatic latent image formed on the photosensitive drum 2.

According to the aforementioned embodiment, in the first flange as the driving-force transmitting part having the protrusion as the driving-force transmitting means, there is provided a construction in which the first gear portion and the rotary sliding portion overlap each other along the axial direction of the first flange, whereby it is realized to shorten the full length of the first flange without decreasing the gear width of the first gear and the fit length of the rotary sliding portion of the first flange and the bearing member.

Also, by providing a projection shape on the inner side of the rotary sliding portion in addition to the first gear portion and the rotary sliding portion, and by making the projection shape (protrusion) overlap the rotary sliding portion along the axial direction of the first flange, a further shortening of the full length of the first flange is produced.

Further, in the first flange as the driving-force transmitting part having the projection shape as the driving-force transmitting means, there is provided a construction in which in addition to the first gear portion as the developing device driving means, the second gear portion as the transfer roller driving means is made adjacent to the protrusion, whereby the driving shaft and transfer roller gear of the image forming apparatus are made proximate to each other and an improvement in the positional accuracy between the two is facilitated and as the result, the curtailment of the gear width of the second gear portion is realized.

As described above, according to the present invention, the lengthwise sizes of the driving-force transmitting part and the electrophotographic photosensitive drum could be made small and further, the sizes of the process cartridge and the electrophotographic image forming apparatus could be made small.

While the invention has been described with reference to the structure disclosed herein, it is not confined to the details set forth and this application is intended to cover such modifications or changes as may come within the purposes of the improvements or the scope of the following claims.

What is claimed is:

1. A process cartridge detachably mountable to a main body of an electrophotographic image forming apparatus for forming an image on a recording medium, the main body having a twisted hole whose cross-section has a plurality of corners, said process cartridge comprising:

an electrophotographic photosensitive drum having a drum cylinder;

a developing roller for developing an electrostatic latent image formed on said electrophotographic photosensitive drum; and a driving-force transmitting part provided on one lengthwise end of said electrophotographic photosensitive drum, said driving-force transmitting part having:

a coupling portion fitted and fixed to one end of said drum cylinder of said electrophotographic photosensitive drum, a twisted protrusion to be fitted in the twisted hole, wherein a cross-section of said twisted protrusion has a plurality of corners, a shaft supported by a bearing portion, a gear portion for transmitting a driving force to said developing roller, said shaft and said gear portion overlapping each other in an axial direction of said electrophotographic photosensitive drum, and a second gear portion provided in juxtaposed relationship with said gear portion and disposed between said gear portion and said coupling portion in the axial direction, wherein said second gear portion transmits a driving force to a transfer roller provided in the main body of the apparatus, wherein when the twisted hole is rotated with said protrusion fitted in the twisted hole when said process cartridge is mounted to the main body of the apparatus, a rotational force of the twisted hole is transmitted to said electrophotographic photosensitive drum through said protrusion, and wherein said coupling portion, said second gear portion, said gear portion, said shaft, and said twisted protrusion provided on an end surface of said shaft are formed integrally.

2. A process cartridge according to claim 1, wherein a through-hole is formed through said coupling portion, said gear portion, said shaft portion overlapping said gear portion, and said protrusion, wherein a grounding pin is provided in the through-hole, wherein said grounding pin is provided on the inner end surface of said driving-force transmitting part, and is in contact with a grounding plate which is in contact with the inner surface of said drum cylinder, whereby when said process cartridge is mounted to the main body of the apparatus, said grounding pin comes into contact with a main body grounding contact provided in the twisted hole, and said electrophotographic photosensitive drum is electrically grounded to the main body of the apparatus.

3. A process cartridge according to claim 1 or 2, wherein a portion of said shaft is surrounded by said gear portion.

4. A process cartridge according to claim 1 or 2, wherein the cross-section of the twisted hole is a substantially equilateral triangle, and the cross-section of said protrusion is a substantially equilateral triangle.

5. An electrophotographic photosensitive drum used in an electrophotographic image forming apparatus for forming an image on a recording medium, the electrophotographic image forming apparatus having a twisted hole the cross-section of which has a plurality of corners, said electrophotographic photosensitive drum comprising:

a drum cylinder having a photosensitive layer on a peripheral surface thereof; and a driving-force transmitting part mounted on one end of said drum cylinder, and having:

a coupling portion fitted and fixed to one end of said drum cylinder of said electrophotographic photosensitive drum, a twisted protrusion to be fitted in the twisted hole, wherein a cross-section of said twisted protrusion has a plurality of corners, a shaft supported by a bearing portion, a gear portion for transmitting a driving force to a developing roller, said shaft and said gear portion overlapping each other in an axial direction of said electrophotographic photosensitive drum, and a second gear portion provided in juxtaposed relationship with said gear portion and disposed between said gear portion and said coupling portion in the axial direction, wherein said second gear portion transmits a driving force to a transfer roller provided in the main body of the apparatus, wherein when the twisted hole is rotated with said protrusion fitted in the twisted hole when said electrophotographic photosensitive drum is mounted to the main body of the apparatus, a driving force for rotating said electrophotographic photosensitive drum is received from the main body of the apparatus, and wherein said coupling portion, said second gear portion, said gear portion, said shaft, and said twisted protrusion provided on an end surface of said shaft are formed integrally.

6. An electrophotographic photosensitive drum according to claim 5, wherein a through-hole is formed through said coupling portion, said gear portion, said shaft portion overlapping said gear portion, and said protrusion, wherein a grounding pin is provided in the through-hole, and wherein said grounding pin is provided on the inner end surface of said driving-force transmitting part, and is in contact with a grounding plate which is in contact with the inner surface of said drum cylinder, whereby when said electrophotographic photosensitive drum is mounted to the main body of the apparatus, said grounding pin comes into contact with a main body grounding contact provided in said twisted hole, and said electrophotographic photosensitive drum is electrically grounded to the main body of the apparatus.

7. An electrophotographic photosensitive drum according to claim 5 or 6, wherein a portion of said shaft is surrounded by said gear portion.

8. An electrophotographic photosensitive drum according to claim 5 or 6, wherein the cross-section of the twisted hole is a substantially equilateral triangle, and the cross-section of said protrusion is a substantially equilateral triangle.

9. A driving-force transmitting part mounted on one end of an electrophotographic photosensitive drum used in a process cartridge detachably mountable to a main body of an electrophotographic image forming apparatus for forming an image on a recording medium, the electrophotographic photosensitive drum having a drum cylinder, the electrophotographic image forming apparatus having a twisted hole whose cross-section has a plurality of corners, said driving-force transmitting part comprising:
   a coupling portion fitted and fixed to one end of the drum cylinder of the electrophotographic photosensitive drum;
   a twisted protrusion to be fitted into the twisted hole when the process cartridge is mounted to the main body of the apparatus, wherein a cross-section of said twisted protrusion had a plurality of corners;
   a shaft supported by a bearing portion when said driving-force transmitting part is mounted in the process cartridge;
   a gear portion for transmitting a driving force to a developing roller, wherein said shaft comprises a shaft portion at which said shaft and said gear portion overlap each other in an axial direction of the electrophotographic photosensitive drum; and
   a second gear portion provided in juxtaposed relationship with said gear portion and disposed between said gear portion and said coupling portion in the axial direction, wherein said second gear portion transmits a driving force to a transfer roller provided in the main body of the apparatus,
   wherein when the twisted hole is rotated with said protrusion fitted in the twisted hole when the process cartridge is mounted to the main body of the apparatus, the rotational force of the twisted hole is received by said protrusion for rotating the electrophotographic photosensitive drum from the rotational force from the main body of the apparatus, and
   wherein said coupling portion, said second gear portion, said gear portion, said shaft, and said twisted protrusion provided on an end surface of said shaft are formed integrally.

10. A driving-force transmitting part according to claim 9, wherein a through-hole is formed through said coupling portion, said gear portion, said shaft portion overlapping said gear portion, and said protrusion,
   wherein a grounding pin is provided in the through-hole, and
   wherein said grounding pin is provided on the inner end surface of said driving-force transmitting part, and is in contact with a grounding plate which is in contact with the inner surface of the drum cylinder, whereby when the process cartridge is mounted to the main body of the apparatus, said grounding pin comes into contact with a main body grounding contact provided in the twisted hole, and the electrophotographic photosensitive drum is electrically grounded to the main body of the apparatus.

11. A driving-force transmitting part according to claim 9 or 10, wherein a portion of said shaft is surrounded by said gear portion.

12. A driving-force transmitting part according to claim 9 or 10, wherein the cross-section of the twisted hole is a substantially equilateral triangle, and the cross-section of said protrusion is a substantially equilateral triangle.

13. An electrophotographic image forming apparatus to which a process cartridge is detachably mountable for forming an image on a recording medium, comprising:
   (a) a twisted hole whose cross-section has a plurality of corners; and
   (b) a mounting portion for detachably mounting the process cartridge, the process cartridge having:
      an electrophotographic photosensitive drum having a drum cylinder;
      a developing roller for developing an electrostatic latent image formed on the electrophotographic photosensitive drum; and
      a driving-force transmitting part provided on one lengthwise end of the electrophotographic photosensitive drum, and having:
         a coupling portion fitted and fixed to one end of the drum cylinder of the electrophotographic photosensitive drum,
         a twisted protrusion to be fitted in said twisted hole, wherein a cross-section of the twisted protrusion has a plurality of corners,
         a shaft supported by a bearing portion,
         a gear portion for transmitting a driving force to the developing roller, wherein the shaft comprises a shaft portion where the shaft and the gear portion overlap each other in an axial direction of the electrophotographic photosensitive drum, and
         a second gear portion provided in juxtaposed relationship with the gear portion and disposed between the gear portion and the coupling portion in the axial direction, the second gear portion transmitting a driving force to a transfer roller provided in the main body of the apparatus,
      wherein when said twisted hole is rotated with the protrusion fitted in said twisted hole when the process cartridge is mounted to the main body of said apparatus, the rotation of said twisted hole is transmitted to the electrophotographic photosensitive drum through the protrusion, and
      wherein the coupling portion, the second gear portion, the gear portion, the shaft, and the twisted protrusion provided on an end surface of the shaft are formed integrally.

14. An electrophotographic photosensitive drum for use in a process cartridge detachably mountable to a main body of an electrophotographic image forming apparatus for forming an image on a recording medium, the main body having a motor, an apparatus main body gear for transmitting a driving force of the motor, and a non-circular twisted hole rotated with the apparatus main body gear, a cross-section of the twisted hole having a plurality of corners, said electrophotographic photosensitive drum comprising:
   a. a cylinder having a photosensitive layer on the peripheral surface thereof; and
   b. a driving-force transmitting part mounted on one end of said cylinder, said driving-force transmitting part comprising:
      a coupling portion fitted and fixed to one end of said cylinder of said electrophotographic photosensitive drum,
      a spur gear for transmitting a driving force received from the main body of the apparatus to a transfer roller provided in the main body of the apparatus when the process cartridge is mounted to the main body of the apparatus, a helical gear provided in juxtaposed relationship with said spur gear and disposed between said spur gear and said coupling portion in an axial direction of said electrophotographic photosensitive drum for transmitting the driving force received from the main body of the apparatus to a developing roller provided in the process cartridge when the process cartridge is mounted to the main body of the apparatus, a shaft portion provided in juxtaposed relationship with said helical gear, and rotatably supported by a bearing portion when said electrophotographic photosensitive drum is mounted in the process cartridge, and a non-circular twisted protrusion fitted into the twisted hole provided in the main body of the apparatus, to receive the transmission of the driving force from the main body of the apparatus, the cross-section of which has a plurality of corners, wherein when said electrophotographic photosensitive drum is mounted in the process cartridge, said shaft portion has an area overlapping an area in which said helical gear is provided, wherein the driving force received from the main body of the apparatus through the twisted hole and said protrusion is transmitted to said cylinder through said helical gear and said spur gear, and is transmitted to the developing roller through said helical gear, and is transmitted to the transfer roller through said spur gear, and wherein said coupling portion, said helical gear, said spur gear, said shaft portion, and said twisted protrusion provided on an end surface of said shaft portion are formed integrally.

15. An electrophotographic photosensitive drum according to claim 14, wherein on the end surface of said helical gear, a circular recess is provided on a line coaxial with an axis, and the bearing portion slides with the outer peripheral surface of said shaft portion and the inner peripheral surface of said recess which is continuous from said outer peripheral surface, and rotatably supports said shaft portion and said recess.

16. An electrophotographic photosensitive drum according to claim 15, further comprising a grounding member for grounding said electrophotographic photosensitive drum to the main body of the apparatus when the process cartridge is mounted to the main body of the apparatus, said grounding member being provided at the center of said driving-force transmitting part in an axial direction thereof.

17. An electrophotographic photosensitive drum according to claim 14, 15 or 16, wherein the tooth width of said spur gear is narrower than the tooth width of said helical gear, and the number of teeth of said spur gear is smaller than the number of teeth of said helical gear.

18. An electrophotographic photosensitive drum according to claim 14, 15 or 16, wherein the shape of said protrusion is a twisted substantially equilateral triangular prism, wherein the corners of said substantially equilateral triangular prism are chamfered, and said protrusion is fitted into the twisted hole whose cross-section is a substantially equilateral triangle.

19. A process cartridge detachably mountable to a main body of an electrophotographic image forming apparatus for forming an image on a recording medium, the electrophotographic image forming apparatus having a motor, a main body gear for transmitting a driving force of the motor, and a non-circular twisted hole provided in a central portion of the main body gear and rotated with the main body gear, wherein a cross-section of the twisted hole has a plurality of corners, said process cartridge comprising:

(a) an electrophotographic photosensitive drum having:
  a. a cylinder having a photosensitive layer on a peripheral surface thereof; and
  b. a driving-force transmitting part mounted on one end of said cylinder and having:
    a coupling portion fitted and fixed to one end of said cylinder of said electrophotographic photosensitive drum,
    a spur gear for transmitting a driving force received from the main body of the apparatus to a transfer roller provided in the main body of the apparatus when said process cartridge is mounted to the main body of the apparatus,
    a helical gear provided in juxtaposed relationship with said spur gear and disposed between said spur gear and said coupling portion in an axial direction of said electrophotographic photosensitive drum for transmitting the driving force received from the main body of the apparatus to a developing roller provided in said process cartridge when said process cartridge is mounted to the main body of the apparatus,
    a shaft portion provided in juxtaposed relationship with said helical gear, and rotatably supported by a bearing portion when said electrophotographic photosensitive drum is mounted in said process cartridge, and
    a non-circular twisted protrusion to be fitted into the twisted hole when said process cartridge is mounted to the main body of the apparatus to receive the transmission of the driving force from the main body of the apparatus and whose cross-section has a plurality of corners,
  wherein when said electrophotographic photosensitive drum is mounted in said process cartridge in the axial direction thereof, said shaft portion has an area overlapping an area in which said helical gear is provided, and transmits the driving force received from the main body of the apparatus to said cylinder through said helical gear and said spur gear, and transmits the driving force to said developing roller through said helical gear, and transmits the driving force to the transfer roller through said spur gear, and
  wherein said coupling portion, said helical gear, said spur gear, said shaft portion, and said twisted protrusion provided on an end surface of said shaft portion are formed integrally; and (b) said developing roller for developing an electrostatic latent image formed on said electrophotographic photosensitive drum.

20. A process cartridge according to claim 19, wherein on the end surface of said helical gear, a circular recess is provided on a line coaxial with an axis, and the bearing portion slides with the outer peripheral surface of said shaft portion and the inner peripheral surface of said recess which is continuous from said outer peripheral surface, and rotatably supports said shaft portion and said recess.

21. A process cartridge according to claim 19 or 20, further comprising a grounding member for grounding said electrophotographic photosensitive drum to the main body of the apparatus when said process cartridge is mounted to the main body of the apparatus, said grounding member being provided at the center of said driving-force transmitting part in an axial direction thereof.

22. A process cartridge according to claim 19 or 20, wherein the tooth width of said spur gear is narrower than the tooth width of said helical gear, and the number of teeth of said spur gear is smaller than the number of teeth of said helical gear.

23. A process cartridge according to claim 19 or 20, wherein the shape of said protrusion is a twisted substantially equilateral triangular prism, wherein the corners of said substantially equilateral triangular prism are chamfered, and wherein said protrusion is fitted in the twisted hole whose cross-section is a substantially equilateral triangle.

24. A driving-force transmitting part for use in a process cartridge detachably mountable to a main body of an electrophotographic image forming apparatus for forming an image on a recording medium, the electrophotographic image forming apparatus having a motor, a main body gear for transmitting a driving force of the motor, and a non-circular twisted hole formed in the central portion of the main body gear and rotated with the main body gear, wherein a cross-section of the twisted hole has a plurality of corners, said driving-force transmitting part comprising:
 a fitted portion to be fitted to a cylinder of an electrophotographic photosensitive drum in order to be mounted on one end of the cylinder;
 a spur gear for transmitting a driving force received from the main body of the apparatus to a transfer roller provided in the main body of the apparatus when the process cartridge is mounted to the main body of the apparatus;
 a helical gear provided in juxtaposed relationship with said spur gear and disposed between said spur gear and said fitted portion in an axial direction of said electrophotographic photosensitive drum for transmitting the driving force received from the main body of the apparatus to a developing roller provided in the process cartridge when the process cartridge is mounted to the main body of the apparatus;
 a shaft portion provided in juxtaposed relationship with said helical gear, and rotatably supported by a bearing portion when the electrophotographic photosensitive drum is mounted in the process cartridge; and
 a non-circular twisted protrusion to be fitted into the twisted hole to receive the transmission of the driving force from the main body of the apparatus wherein the cross-section of said protrusion has a plurality of corners,
 wherein when the electrophotographic photosensitive drum is mounted in the process cartridge in an axial direction thereof, said shaft portion has an area overlapping an area in which said helical gear is provided, and transmits the driving force received from the main body of the apparatus through the twisted hole and said protrusion to the cylinder through said helical gear and said spur gear, and transmits the driving force to the developing roller through said helical gear, and transmits the driving force to the transfer roller through said spur gear, and
 wherein said fitted portion, said helical gear, said spur gear, said shaft portion, and said twisted protrusion provided on an end surface of said shaft portion are formed integrally.

25. A driving-force transmitting part according to claim 24, wherein on the end surface of said helical gear, a circular recess is provided on a line coaxial with an axis, and the bearing portion slides with the outer peripheral surface of said shaft portion and the inner peripheral surface of said recess which is continuous from said outer peripheral surface, and rotatably supports said shaft portion and said recess.

26. A driving-force transmitting part according to claim 24 or 25, further comprising a grounding member for grounding the electrophotographic photosensitive drum to the main body of the apparatus when the process cartridge is mounted to the main body of the apparatus, said grounding member being provided at the center of said driving-force transmitting part in an axial direction thereof.

27. A driving-force transmitting part according to claim 24 or 25, wherein the tooth width of said spur gear is narrower than the tooth width of said helical gear, and the number of teeth of said spur gear is smaller than the number of teeth of said helical gear.

28. A driving-force transmitting part according to claim 24 or 25, wherein the shape of said protrusion is a twisted substantially equilateral triangular prism, the corners of said substantially equilateral triangular prism are chamfered, and said protrusion is fitted in the twisted hole whose cross-section is a substantially equilateral triangle.

29. An electrophotographic image forming apparatus to which a process cartridge is detachably mountable for forming an image on a recording medium, comprising:
 (a) a motor;
 (b) a main body gear in a main body of said apparatus for transmitting a driving force of said motor;
 (c) a non-circular twisted hole provided in a central portion of said main body gear and rotated with said main body gear, a cross-section of said twisted hole having a plurality of corners;
 (d) a transfer roller for transferring a developed image formed on an electrophotographic photosensitive drum to the recording medium; and
 (e) a mounting portion for detachably mounting the process cartridge, the process cartridge having:
  (i) the electrophotographic photosensitive drum including:
   a. a cylinder having a photosensitive layer on a peripheral surface thereof;
   b. a driving-force transmitting part mounted on one end of the cylinder, the driving-force transmitting part having:
    a coupling portion fitted and fixed to one end of the cylinder of the electrophotographic photosensitive drum,
    a spur gear for transmitting a driving force received from the main body of said apparatus to said transfer roller when the process cartridge is mounted to the main body of said apparatus,
    a helical gear provided in juxtaposed relationship with the spur gear and disposed between the spur gear and the coupling portion in an axial direction of the electrophotographic photosensitive drum for transmitting the driving force received from the main body of said apparatus to a developing roller provided in the process cartridge when the process cartridge is mounted to the main body of said apparatus,
    a shaft portion provided in juxtaposed relationship with the helical gear, and rotatably supported by a bearing portion when the electrophotographic photosensitive drum is mounted in the process cartridge, and
    a non-circular twisted protrusion fitted into said twisted hole to receive the transmission of the driving force from the main body of said apparatus when the process cartridge is mounted to the main body of said apparatus, and whose cross-section has a plurality of corners, wherein when the electrophotographic photosensitive drum is mounted in the process cartridge in the axial direction thereof, the shaft portion has an area overlapping an area in which the helical gear is provided, and transmits the driving force received from the main body of said apparatus through said twisted hole and the protrusion to the cylinder through the helical gear and the spur gear, and transmits the driving force to said developing roller through the helical gear, and transmits the driving force to said transfer roller through the spur gear; and wherein the coupling portion, the helical gear, the spur gear, the shaft portion, and the twisted protrusion provided on an end surface of the shaft portion are formed integrally; and (ii) said developing roller for developing an electrostatic latent image formed on the electrophotographic photosensitive drum.

* * * * *